R. WALKER.
DRIVING AND BRAKING MECHANISM FOR CYCLES AND THE LIKE.
APPLICATION FILED FEB. 29, 1908.
913,332.
Patented Feb. 23, 1909.
2 SHEETS—SHEET 1.
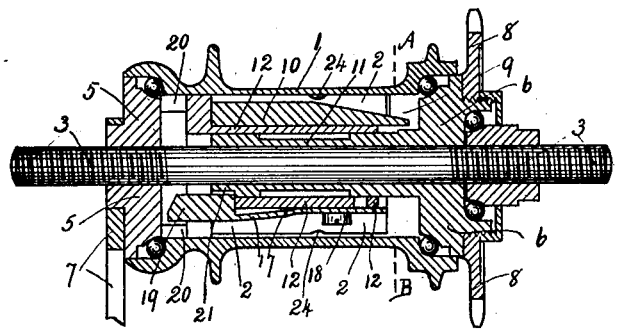
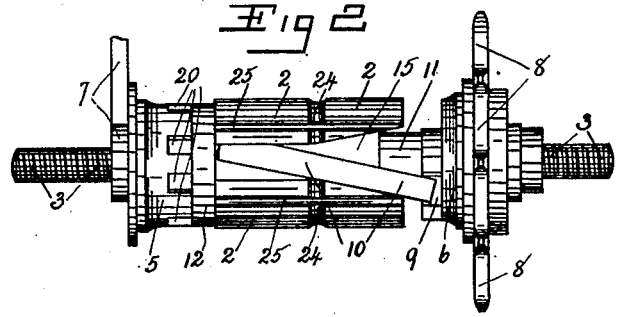
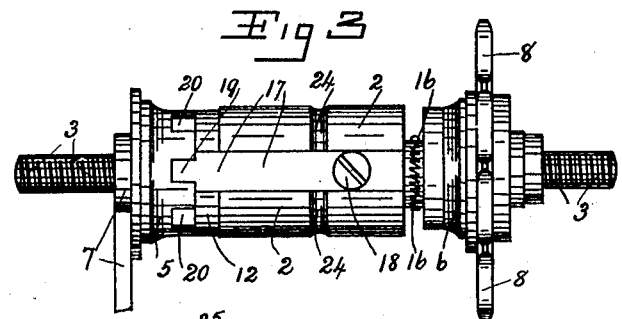
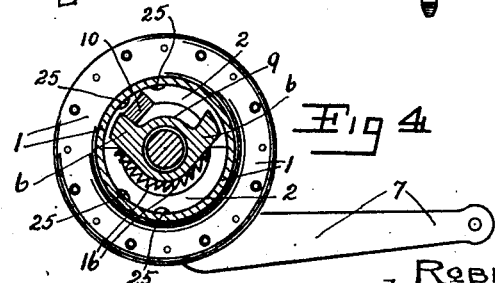
WITNESSES
INVENTOR,
ROBERT WALKER,
Attorneys.

R. WALKER.
DRIVING AND BRAKING MECHANISM FOR CYCLES AND THE LIKE.
APPLICATION FILED FEB. 29, 1908.
913,332.
Patented Feb. 23, 1909.
2 SHEETS—SHEET 2.
Fig 6
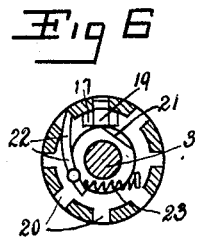
Fig 7
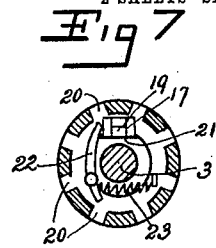
Fig 5
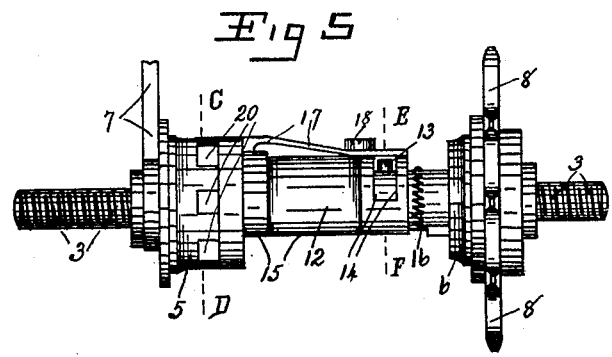
Fig 8
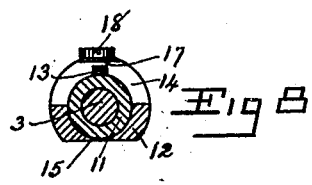
Fig 9
Fig 10
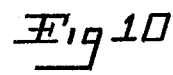
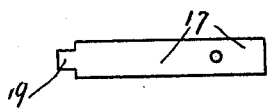
WITNESSES:
INVENTOR,
ROBERT WALKER,
by van Oldenneel & Schoenlank
Attorneys.

UNITED STATES PATENT OFFICE.

ROBERT WALKER, OF PLYMOUTH, ENGLAND.

DRIVING AND BRAKING MECHANISM FOR CYCLES AND THE LIKE.

No. 913,332.           Specification of Letters Patent.           Patented Feb. 23, 1909.

Application filed February 29, 1908. Serial No. 418,617.

*To all whom it may concern:*

Be it known that I, ROBERT WALKER, subject of the King of Great Britain, residing at Sawrey street, Plymouth, in the county of Devon, England, have invented a new and useful Improvement in Driving and Braking Mechanism for Cycles and the Like; and I do hereby declare the following to be a full, clear, and exact description of the same.

My invention comprises improvements in driving and braking mechanism for cycles and the like and refers to improvements or modifications of the invention forming the subject of my prior application Serial Number 403,015; the object of my said invention being to simplify and improve the arrangement, construction and action of various parts of the invention contained in the said prior specification.

According to this invention I improve the driving action by providing means for normally keeping the mechanism in such position that it is just ready to expand for driving; and dispense with the longitudinally shifting stop, employed when braking, my present invention employing a simpler and more efficient device for this purpose.

Referring to the drawings:—Figure 1 is a longitudinal section of a coaster hub according to my invention. Fig. 2 shows the interior of same, with hub shell removed, the expanding lever being in its braking position. Fig. 3 is a similar view to Fig. 2 but at the opposite side showing the stop catch instead of the lever. Fig. 4 is a transverse section at A—B in Fig. 1 looking away from the sprocket end. Fig. 5 shows the device, with the hub shell, expanding cylinder and lever all removed, the stop catch being in its raised position as in braking. Figs. 6 and 7 are transverse sections at C—D in Fig. 5 with the catch and pawl in their braking and driving positions respectively. Fig. 8 is a section at E—F in Fig. 5 showing the slot and pin connection between the inner and outer sleeves. Fig. 9 shows the stop catch removed, in side elevation, while Fig. 10 is a plan of the same catch.

In constructing a coaster hub according to my invention as illustrated upon the accompanying drawings, within the hub shell 1, I arrange an expansible split cylinder 2 preferably divided longitudinally into two parts.

The hub shell is supported on the spindle 3 by cones 5 and 6, the former being fixed to the spindle 3 by an arm 7, while the sprocket wheel 8 is secured on the cone 6 and adapted to rotate, or reciprocate it, for the purpose of providing a driving engagement, or during braking. In the inner end of the cone 6 is a notch 9 engaging the extremity of the lever 10.

Projecting from, and preferably integral with, the cone 6 is a sleeve 11, called the "inner sleeve" and around same is an outer sleeve 12; these two sleeves being connected together by a pin 13 in sleeve 11 traveling in a slot 14 in sleeve 12, in such manner as to prevent any relative longitudinal movement; but causing the outer sleeve to rotate with the inner sleeve when the pin reaches the end of the slot when driving.

The lever 10 lies on a flat surface 15 on sleeve 12 and in a space between the adjacent edges of the split cylinder 2 which is adapted to be expanded for driving and braking in the manner explained in my aforementioned prior specification. To normally keep the sprocket wheel and lever in the position ready to drive I connect the end of the sleeve 12 to the cone 6 by means of a spiral spring 16 which is stretched during braking or free wheeling In order to enable the brake to be applied in back pedaling it is necessary to prevent backward rotation of the cylinder. According to this invention I achieve this object in an exceedingly simple manner by means of a spring catch 17 secured to the outer sleeve 12 by a screw 18, the nose 19 of said catch being designed to engage any one of the notches 20 in the cone 5 when raised in manner now explained. As seen in Fig. 7 the catch clears the notches during coasting and driving; and to raise same on back pedaling I reduce the end of the sleeve 11 at 21 to form a cam which allows the catch to normally lie in an inner position while on back pedaling it is raised to the position seen in Fig. 6. To facilitate the engagement of the catch and notches I provide a temporary stop comprising a pivoted pawl 22 on the end of sleeve 12 said pawl being lifted by a spring 23 into engagement with a notch and thereby holding the cone and sleeve in the required relative positions to enable the catch to enter a notch when said catch is raised by the backward rotation of the cam 21.

Obviously on back pedaling, backward rotation of the sleeve and cylinder is first prevented in manner explained, while a further backward movement of the pedals expands the cylinder and brings it into engagement with the interior of the hub to form a brake.

To enable the oil to get away when the cylinder is expanded and to improve the engagement thereof; I may form same with a number of longitudinal grooves as 25, or an annular groove as 24 the latter preferably corresponding with the nipple.

What I claim then is:—

1. In driving and braking mechanism for cycles and the like, the combination of a hub shell, an expansible split cylinder located in said hub shell, a rotatable cone, a sprocket wheel fixed to said cone, means for expanding said cylinder when the sprocket wheel and cone are operated in either direction, a fixed cone having notches on its inner face, a sleeve supporting the expansible cylinder aforesaid, a spring catch carried by said sleeve, and an inner sleeve secured to the rotary cone aforesaid and having a cam surface designed to engage said catch and shift it into engagement with the fixed cone during back pedaling, all for the purpose specified and substantially as set forth.

2. In driving and braking mechanism for cycles and the like, the combination of a hub shell, a rotatable cone, a sprocket wheel fixed to said cone, means for expanding said cylinder when the sprocket wheel and cone are operated in either direction, a fixed cone having notches on its inner face, a sleeve supporting the expansible cylinder aforesaid, a spring catch carried by said sleeve, an inner sleeve secured to the rotary cone aforesaid and having a cam surface designed to engage said catch and shift it into engagement with the fixed cone during back pedaling, and a pivoted spring pawl on the end of the cylinder supporting sleeve engaging the fixed cone, all for the purpose specified and substantially as set forth.

3. In driving and braking mechanism for cycles and the like, the combination of a hub shell, an expansible split cylinder located in said hub shell and having a longitudinal slot, a longitudinally disposed lever located in said cylinder, a rotary cone engaging said lever, a sprocket wheel secured to said cone, a sleeve supporting said cylinder, and a spring connecting said cone to said sleeve, substantially as set forth.

4. In driving and braking mechanism for cycles and the like, the combination of a hub shell, an expansible split cylinder located in said hub shell and having longitudinal grooves on its surface for allowing escape of oil on expansion and for giving increased braking and driving power, and means for expanding said cylinder, substantially as set forth.

5. In driving and braking mechanism for cycles and the like, the combination of a hub shell, an expansible split cylinder located in said hub shell, means for expanding said cylinder in driving and braking, a fixed cone having notches on its inner face, a sleeve, a catch carried by same, and an inner sleeve rotatable on back pedaling, and having a cam surface whereby the catch is shifted into engagement with the fixed cone on back pedaling, substantially as set forth.

6. In driving and braking mechanism for cycles and the like, the combination of a hub shell, an expansible split cylinder located in said hub shell, means for expanding said cylinder in driving and braking, a fixed cone having notches on its inner face, a sleeve, a catch carried by same, an inner sleeve rotatable on back pedaling and having a cam surface whereby the catch is shifted into engagement with the fixed cone on back pedaling, and a pivoted spring pawl on the end of the cylinder supporting sleeve also engaging the fixed cone, all for the purpose specified and substantially as set forth.

In testimony whereof, I have signed my name to this specification in the presence of two subscribing witnesses.

ROBERT WALKER.

Witnesses:
HAROLD J. C. FONESTER,
NORMAN S. BARLOW.